No. 795,438. PATENTED JULY 25, 1905.
L. W. GIBSON, DEC'D.
L. M. GIBSON, ADMINISTRATRIX.
STEAM COOKER.
APPLICATION FILED JUNE 29, 1904.
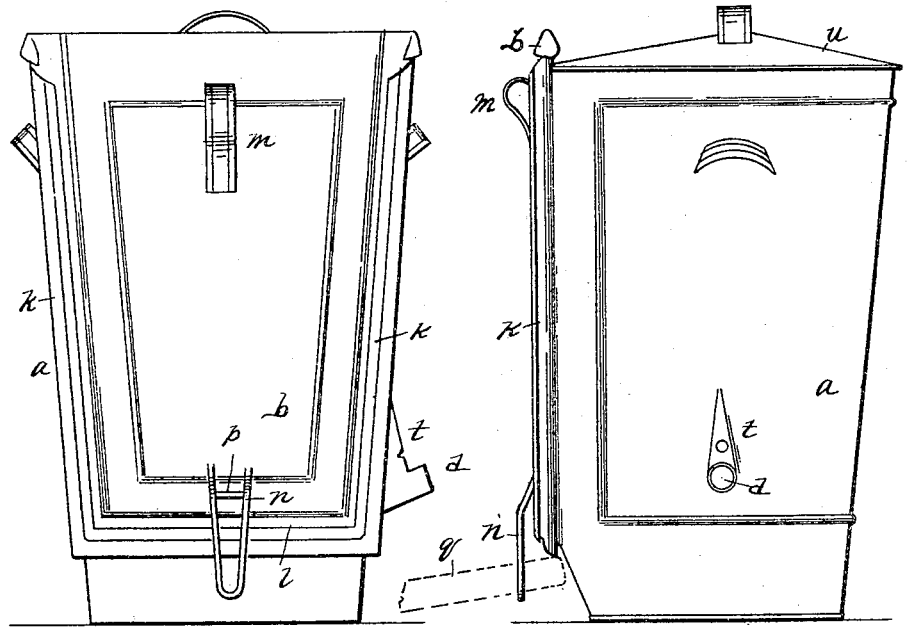
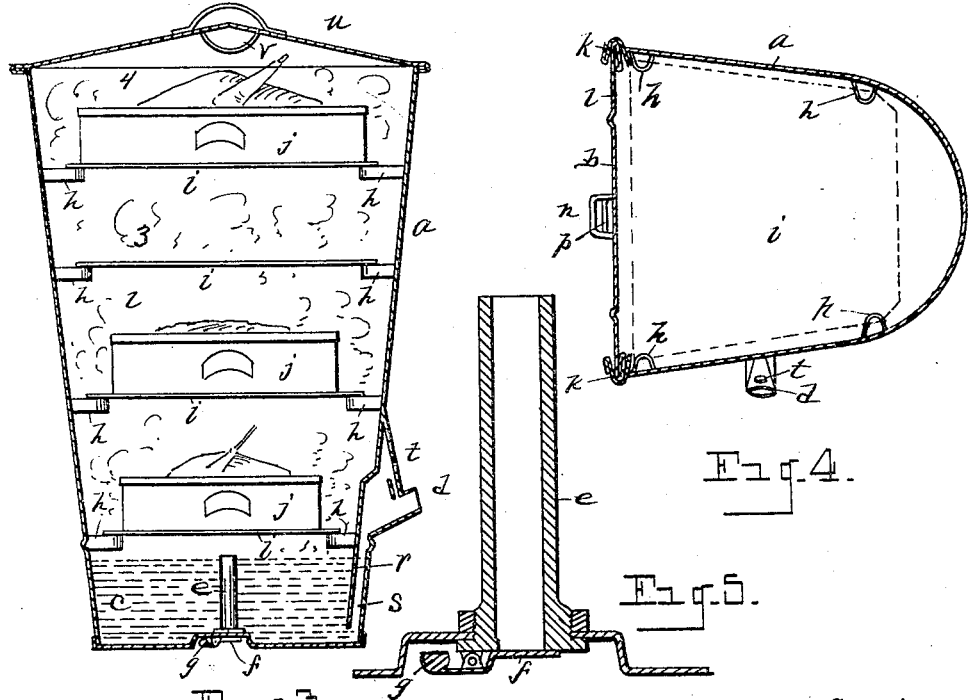

UNITED STATES PATENT OFFICE.

LUCY M. GIBSON, OF DETROIT, MICHIGAN, ADMINISTRATRIX OF LEWIS W. GIBSON, DECEASED.

STEAM-COOKER.

No. 795,438.      Specification of Letters Patent.      Patented July 25, 1905.

Application filed June 29, 1904. Serial No. 214,592.

*To all whom it may concern:*

Be it known that LEWIS W. GIBSON, late a citizen of the United States and a resident of Detroit, county of Wayne, State of Michigan, did invent a certain new and useful Improvement in Steam-Cookers, of which the following is a specification, reference being had to the accompanying drawings, which form a part of this specification.

This invention has for its object certain new and useful improvements in steam-cookers; and it consists of the construction, combination, and arrangement of devices hereinafter specified and claimed, and illustrated in the accompanying drawings, in which—

Figure 1 is a view in front elevation. Fig. 2 is a view in side elevation. Fig. 3 is a view in vertical cross-section. Fig. 4 is a view in horizontal cross-section. Fig. 5 is an enlarged detail view of the relief-pipe and its valve.

The importance of economical and effective devices for cooking by steam is well understood and the value and utility of convenient utensils for this purpose. To this end it is desirable that the process of cooking by steam should be carried on with the smallest volume of water present in the generator consistent with safety and success.

The purpose of this invention is to provide a simple and reliable steam-cooker convenient of access and arranged so that the operator may readily examine or remove the contents of any one of the several compartments of which it is constituted.

To this end this invention consists, essentially, of the body or main portion of the cooker shown in the drawings, and consists of an inclosing case $a$, provided with a sliding door $b$. The base of the inclosing case $a$ is constructed with a chamber $c$ to hold a limited supply of water, the chamber $c$ constituting a steam-generating chamber. As shown in the drawings, $d$ represents an inlet feed-pipe, through which water may be supplied to the generating-chamber. The generating-chamber is also provided with a blow-off pipe $e$, projecting upward therewithin above the normal water-level, the lower end of the blow-off pipe $e$ extending through the base of the chamber and provided with a blow-off valve $f$, said valve being preferably weighted, as indicated at $g$, so that the valve will be held in closed position until the pressure of steam within the cooker rises above a desired quantity. When the steam-pressure has unduly accumulated, the valve $f$ will be opened to relieve the cooker from pressure, after which it will be automatically restored to closed position.

The bottom of the case of the cooker is preferably recessed or countersunk, as indicated in Figs. 3 and 5, to receive the lower end of the pipe $e$ and its valve $f$ within the recess or countersunk portion of the bottom of the case and so that the cooker may rest upon the stove or upon a table while the food to be cooked is placed therein or being removed therefrom. The upper portion of the interior of the cooker is divided into various compartments—as indicated, for example, at 1 2 3 4—the interior wall of the cooker being provided with a series of supports or brackets (indicated at $h$) to support corresponding shelves, (indicated at $i$,) upon which various utensils (indicated at $j$) may be placed.

The sliding door $b$ is preferably tapered toward its lower end, as shown, the case being provided at the front lateral edges thereof with suitable guideways (indicated at $k$) to receive the edges of the sliding door. These guideways are preferably provided with suitable packing, so as to make the sliding door steam-tight. The case $a$ is also constructed with a receiving-guideway $l$ at the base thereof similar in construction to the lateral guideways $k$ to receive the lower end of the sliding door. It is preferred to provide the sliding door with a handle $m$ toward the upper end thereof and with an operating device or handle $n$ at the lower end thereof, the device or handle being preferably shaped in the form of a downwardly-projecting loop, the loop provided with a cross-arm $p$ toward the upper portion thereof. The loop projects downwardly over the lower guideway of the case, permitting a poker or other similar utensil $q$ to be inserted through the loop to bear against the lower guideway to force the door down snugly into closed position. The provision of the cross-bar $p$ also enables the poker or other similar instrument to be inserted directly thereunder and above the upper edge of the lower guideway to assist, if need be, in lifting the door out of closed position.

Projecting downward within the generating-chamber $c$ is a diaphragm $r$, forming a channel between the diaphragm and the adjacent portion of the case (indicated at $s$) communicating with the inlet-channel $d$. This diaphragm $r$ projects downward near to the base of the generating-chamber, permitting communication of the channel $s$ with the generating-chamber, as shown.

At $t$ is indicated any suitable whistling mechanism. It will be evident that when the water in the generating-chamber gets sufficiently low to open communication for steam to pass upward from the generating-chamber through the channel $s$ to the whistle mechanism a signal will be sounded, indicating low water in the generating-chamber.

It will be understood that the lateral and lower guideways for the door form a tapered guide-frame to receive the lateral and lower edges of the door, enabling the door to be closed tightly when forced downward into place.

To the interior of the cover $u$ of the device is secured a device or loop (indicated at $v$, Fig. 3) from which any desired article to be cooked may be suspended. It is obvious that by removing the upper shelves and the cooking utensils thereupon a turkey may be suspended from the device $v$.

What is claimed as the invention is—

1. A steam-cooker comprising therewithin a cooking-chamber and a steam-generating chamber, means to feed a supply of water into the generating-chamber, and a relief-pipe opening at its upper end into the steam-generating chamber above the normal water-line therein and projecting at its lower end through the base of the generating-chamber, said relief-pipe provided at its lower end with an automatically-controlled valve.

2. A steam-cooker comprising therewithin a cooking-chamber and a steam-generating chamber, a water-feed inlet-pipe, and relief-pipe opening at its upper end into the steam-generating chamber above the normal water-line therein and projecting at the lower end, through the base of the generating-chamber, said relief-pipe provided at its lower end with an automatically-controlled valve.

3. A steam-cooker comprising a case forming therewithin a cooking-chamber having multiple compartments arranged one above the other, and provided on one side thereof with oppositely-arranged vertical guideways, a steam-generating chamber below the cooking-chamber, a feed inlet-pipe to supply water to the steam-generating chamber and a vertically-sliding door above the steam-generating chamber located in said guideways whereby access may be had to the lower compartments of the cooking-chamber without unclosing the upper compartments of said chamber.

4. A steam-cooker comprising a case forming therewithin a cooking-chamber having multiple compartments arranged one above the other and provided on one side thereof with oppositely-arranged vertical guideways, a steam-generating chamber below the cooking-chamber, a feed inlet-pipe to supply water to the steam-generating chamber, a vertically-sliding door located in said guideways, and means at the base of the door whereby said door may be forced into steam-tight engagement with the case of the cooker, and whereby access may be had to the lower compartments of the cooking-chamber without unclosing the upper compartments of said chamber.

5. A steam-cooker comprising a case forming therewithin a cooking-chamber having multiple compartments one above the other and provided on one side thereof with oppositely-arranged vertical guideways, a steam-generating chamber below the cooking-chamber, a water-feed inlet-pipe, a relief-pipe opening into the steam-generating chamber above the normal water-line therein, and provided with an automatically-controlled valve, and a vertically-sliding door above the steam-generating chamber located in said guideways whereby access may be had to the lower compartments of the cooking-chamber without unclosing the upper compartments of said chamber.

In testimony whereof I have signed this specification in the presence of two subscribing witnesses.

LUCY M. GIBSON,
*Administratrix of the estate of Lewis W. Gibson, deceased.*

Witnesses:
   N. S. WRIGHT,
   M. L. SIMMONS.